(12) United States Patent
Demopoulos et al.

(10) Patent No.: US 9,783,428 B1
(45) Date of Patent: Oct. 10, 2017

(54) PRODUCTION OF HIGH STRENGTH HYDROCHLORIC ACID FROM CALCIUM CHLORIDE FEED STREAMS BY CRYSTALLIZATION

(71) Applicant: THE ROYAL INSTITUTION FOR THE ADVANCEMENT OF LEARNING/MCGILL UNIVERSITY, Montreal (CA)

(72) Inventors: George Demopoulos, Montreal (CA); Thomas Feldmann, Montreal (CA)

(73) Assignee: THE ROYAL INSTITUTION FOR THE ADVANCEMENT OF LEARNING/MCGILL UNIVERISITY, Montréal, QC (*) Notice: Subject to any disclaimer, the term of this patent is extended or adjusted under 35 U.S.C. 154(b) by 0 days.

(21) Appl. No.: 15/091,666

(22) Filed: Apr. 6, 2016

(51) Int. Cl.
| | |
|---|---|
| *C01F 11/46* | (2006.01) |
| *C22B 26/20* | (2006.01) |
| *C22B 3/10* | (2006.01) |
| *C22B 3/44* | (2006.01) |
| *C01B 7/03* | (2006.01) |
| *E04B 2/00* | (2006.01) |

(52) U.S. Cl.
CPC .............. *C01F 11/46* (2013.01); *C01B 7/035* (2013.01); *C22B 3/10* (2013.01); *C22B 3/44* (2013.01); *C22B 26/20* (2013.01)

(58) Field of Classification Search
CPC . C01F 11/46; C22B 26/20; C22B 3/10; C22B 3/44; C01B 7/03; C01B 7/035; E04B 2/00
See application file for complete search history.

(56) References Cited

U.S. PATENT DOCUMENTS

| | | | | | |
|---|---|---|---|---|---|
| 2,706,145 | A | * | 4/1955 | Cannon | C01B 7/03 423/552 |
| 2,845,337 | A | * | 7/1958 | Myers | B01J 2/30 210/698 |
| 4,120,737 | A | * | 10/1978 | Berrie | C01F 11/46 106/772 |
| 5,733,070 | A | * | 3/1998 | Angell | C09K 17/06 405/263 |

(Continued)

OTHER PUBLICATIONS

Al-Othman et al. "Gypsum crystallization and hydrochloric acid regeneration by reaction of calcium chloride solution with sulfuric acid", Hydrometallurgy, 96 (2009) 95-102.

*Primary Examiner* — Timothy Vanoy
(74) *Attorney, Agent, or Firm* — Norton Roe Fulbright LLP

(57) ABSTRACT

The present relates to a method for producing calcium sulfate solid crystals and hydrochloric acid (HCl) from a calcium chloride solution comprising the steps of feeding a continuous stirred-tank reactor with a calcium chloride solution, sulfuric acid and water; mixing the calcium chloride solution, sulfuric acid and water in the reactor; and maintaining the reactor a temperature of less than about 70° C., converting the calcium chloride solution, sulfuric acid and water into HCl and calcium sulfate solid crystals. The method described herein can be incorporated as a means for regenerating HCl from $CaCl_2$ solutions which are generated in the metallurgical industry when processing calcium-bearing ores for recovering metals like rare earth elements.

14 Claims, 6 Drawing Sheets

(56) References Cited

U.S. PATENT DOCUMENTS

| | | | |
|---|---|---|---|
| 6,843,976 B2 * | 1/2005 | Allen | C22B 3/10 |
| | | | 423/622 |
| 7,700,066 B1 * | 4/2010 | Yang | C01F 11/46 |
| | | | 423/555 |
| 2007/0295613 A1 * | 12/2007 | Moyes | C22B 3/08 |
| | | | 205/771 |
| 2010/0086474 A1 * | 4/2010 | Yang | C01F 11/46 |
| | | | 423/555 |

* cited by examiner

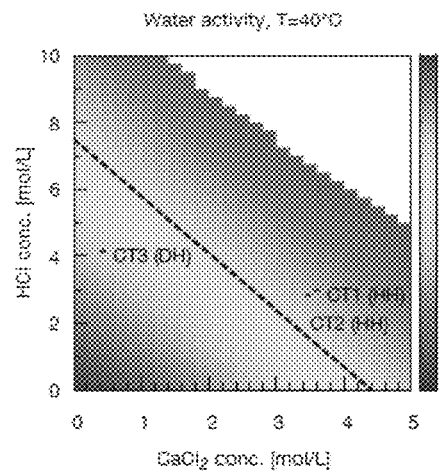
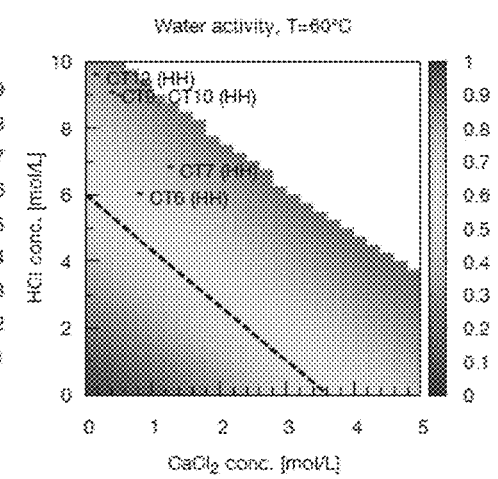
Fig. 3A  Fig. 3B
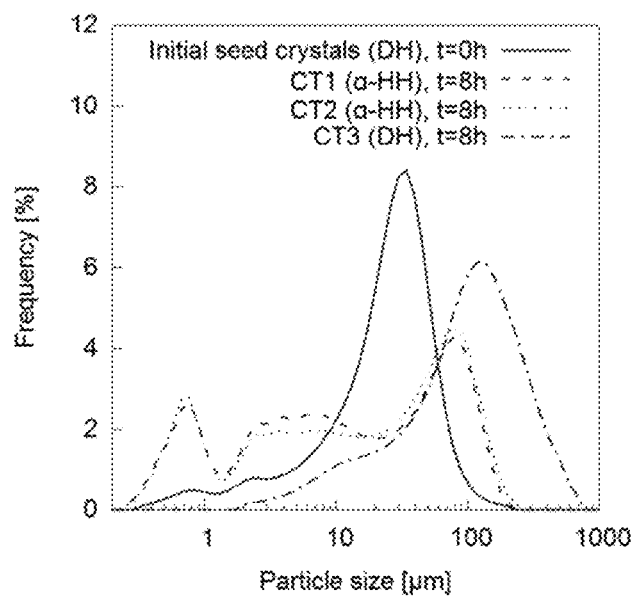
Fig. 4
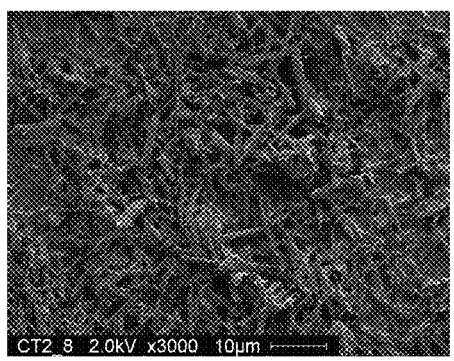
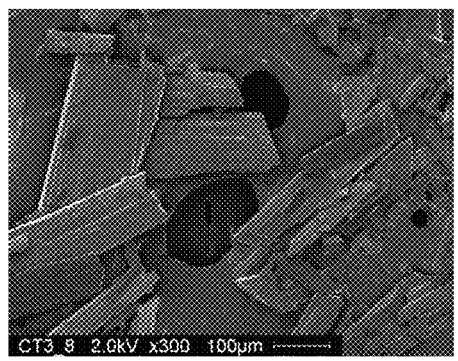
Fig. 5A  Fig. 5B

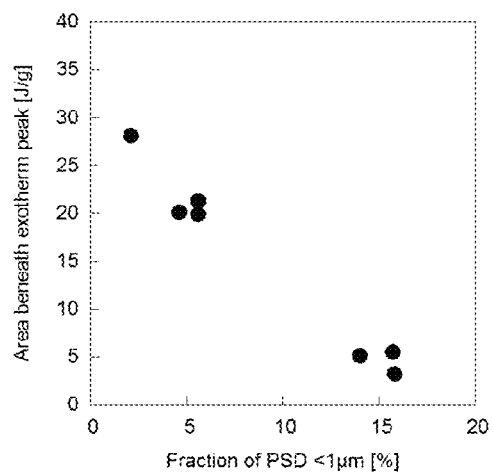
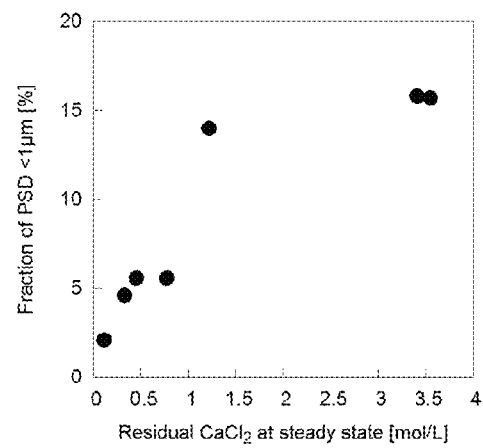
Fig. 8A   Fig. 8B
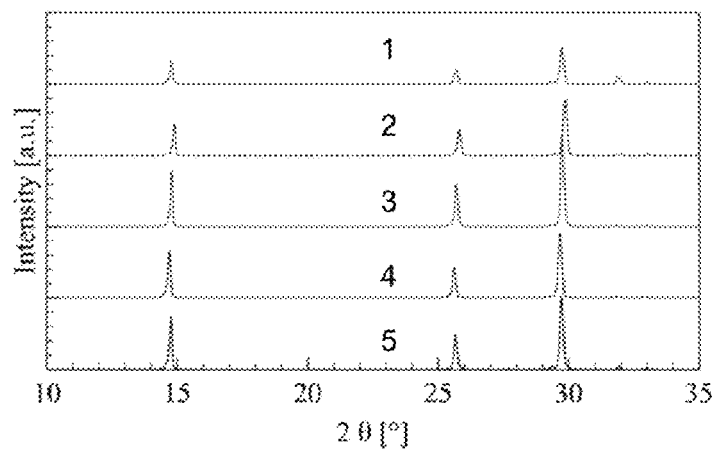
Fig. 9
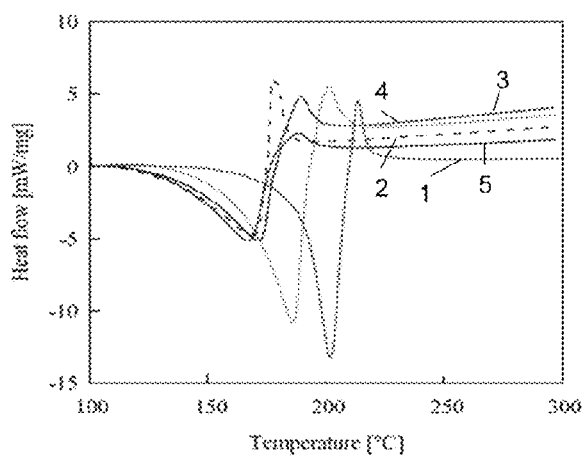
Fig. 10

PRODUCTION OF HIGH STRENGTH HYDROCHLORIC ACID FROM CALCIUM CHLORIDE FEED STREAMS BY CRYSTALLIZATION

TECHNICAL FIELD

The present relates to a process for the production of high strength hydrochloric acid from calcium chloride feed streams.

BACKGROUND ART

Hydrochloric acid (HCl)-based leaching of calcium-based rock, with the goal of extracting valuable metals such as rare earth elements, can produce a $CaCl_2$ solution by-product. The extraction of these metals relies on the use of concentrated HCl, typically of azeotropic strength. The $CaCl_2$ solutions cannot be released into the environment due to their high concentration of chloride ions and have to be processed further. This is ideally done in a way that offers the possibility to reclaim the HCl used by the process (acid recycling). Therefore, in order to enable the leaching of minerals with HCl on an industrial scale, the acid needs to be recovered. Conventional HCl recovery techniques, such as pyrohydrolysis for iron chloride solutions, are used at industrial scale, but are not economically feasible for the treatment of $CaCl_2$ solution for fundamental thermodynamic reasons. The pyrohydrolysis of $CaCl_2$ requires temperatures of up to 1000° C. to recover the HCl.

It is thus desirable to have a means to treat the concentrated calcium chloride solutions generated from the processing of calcium-based rock, thereby allowing recovery of the chloride units as high strength HCl for re-use.

SUMMARY

In accordance with the present disclosure there is now provided a method for producing calcium sulfate solid crystals and hydrochloric acid (HCl) from a calcium chloride solution comprising the steps of feeding a continuous-stirred tank reactor with a calcium chloride solution, sulfuric acid and water; mixing the calcium chloride solution, sulfuric acid and water in the reactor; and maintaining the reactor at a temperature of less than about 70° C., converting the calcium chloride solution, sulfuric acid and water into HCl and calcium sulfate solid crystals.

In an embodiment, the calcium sulfate solid crystals are crystals of at least one of calcium sulfate dihydrate, calcium sulfate α-hemihydrate and mixture thereof.

In another embodiment, the azeotropic HCl is obtained with calcium sulfate solid crystals.

In another embodiment, up to 30 wt % (9.5 mol/L) of super-azeotropic HCl is obtained.

In an additional embodiment, the ratio of sulfate to calcium in the reactor is 0.90 to 0.98.

In a further embodiment, the temperature of the reactor is about less than 60° C.

In another embodiment, the temperature of the reactor is about 40° C.-70° C.

In an embodiment, the temperature of the reactor is about 40° C. or less.

In another embodiment, the reactor is continuously fed with calcium chloride solution, sulfuric acid and water, continuously producing HCl and calcium sulfate solid crystals.

In an embodiment, the calcium chloride solution is a feed stream from the processing of calcium-bearing ores.

In another embodiment, calcium chloride solution, sulfuric acid and water are fed in multiple parallel reactors.

Also encompassed is a process of extracting metals from calcium-bearing ores comprising the steps of leaching the ores with HCl, producing a leachate containing a calcium chloride solution and metals; separating the metals from the calcium chloride solution; feeding a continuous-stirred tank reactor with the calcium chloride solution, sulfuric acid and water; mixing the calcium chloride solution, sulfuric acid and water in the reactor; maintaining the reactor at a temperature of less than about 70° C., converting the calcium chloride solution, sulfuric acid and water into HCl and calcium sulfate solid crystals; and recycling the HCl to the leaching of the ores.

In an embodiment, the metals are rare earths.

It is also provided a construction board comprising calcium sulfate α-hemihydrate produced by the method or process described herein.

BRIEF DESCRIPTION OF THE DRAWINGS

Reference will now be made to the accompanying drawings.

FIG. 3A illustrates a model-based estimation of water activity $a_w$ as a function of $CaCl_2$ concentration and HCl concentration at 40° C., wherein (*) indicates the steady state composition, the solid observed to form experimentally is given in ( ); - - - - (dashed line) signifies the water activity line at which DH and HH have the same metastability; above the line HH is relatively more stable than DH and below the line the reverse is true.

FIG. 3B illustrates a model-based estimation of water activity $a_w$ as a function of $CaCl_2$ concentration and HCl concentration at 60° C., wherein (*) indicates the steady state composition, the solid observed to form experimentally is given in ( ), - - - - (dashed line) signifies the water activity line at which DH and HH have the same metastability; above the line HH is relatively more stable than DH and below the line the reverse is true.

FIG. 4 illustrates a comparison of particle size distributions obtained from experiments CT1, CT2 and CT3 after 8 h of experiment.

FIG. 5A illustrates the crystal morphologies of steady-state products (after 8 h) from experiment CT2 calcium sulfate hemihydrate.

FIG. 5B illustrates the crystal morphologies of steady-state products (after 8 h) from experiment CT3 calcium sulfate dihydrate.

FIG. 8A illustrates the relationship between the amount of fine particles and the exothermic peak in a DSC scan.

FIG. 8B illustrates the relationship between the amount of fine particles and the steady-state $CaCl_2$ content.

FIG. 9 illustrates the comparison of x-ray diffraction (XRD) patterns of solid produced in the continuous process as encompassed herein (t=8 h) (CT12: 2; CT10: 3; CT9: 4; and CT6: 5) with α-HH reference material produced in the autoclave process.

FIG. 10 illustrates a comparison of DSC patterns of solid produced in the continuous process (t=8 h) (CT12: 2; CT10: 3; CT9: 4; and CT6: 5) with α-HH reference material produced in the autoclave process.

It will be noted that throughout the appended drawings, like features are identified by like reference numerals.

DETAILED DESCRIPTION

Figure 1:
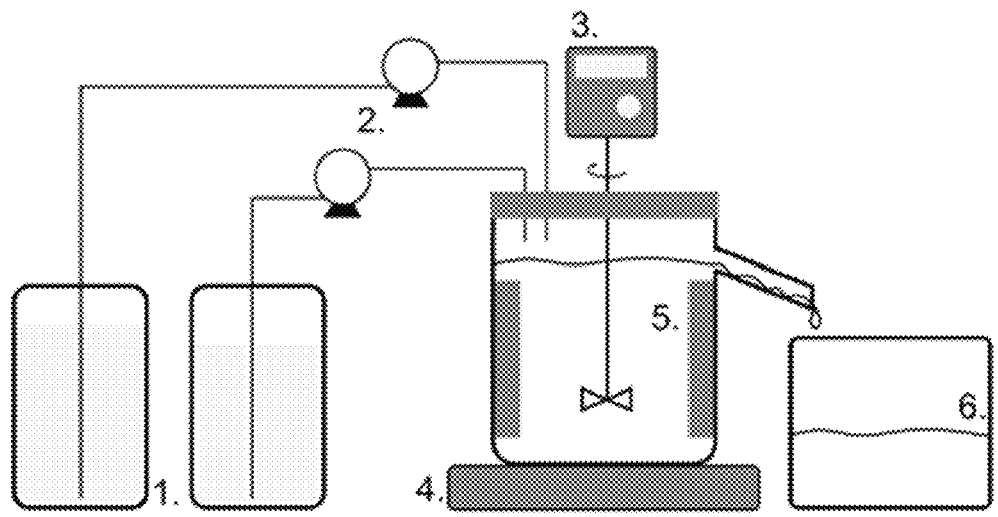
FIG. 1 illustrates an experimental set-up for a continuous process as encompassed herein.

It is provided a process for the production of high strength (sub-azeotropic, azeotropic or super-azeotropic) hydrochloric acid from calcium chloride feed streams.

Using a low temperature (40-70° C.) hydrochemical process, the process described herein produces a solid calcium sulfate product (calcium sulfate α-hemihydrate; α-HH or calcium sulfate dihydrate; DH). Especially, α-HH is currently only produced by an energy intensive and labor intensive autoclave process that operates at approximately 115° C.

It is demonstrated that the process described herein resulted in a production rate of approximately 0.5 $kg_{\alpha-HH}$/h and 0.9 $kg_{conc.\ HCl\ solution}$/h. The process described herein can be embedded in any hydrometallurgical/chemical operation that generates a concentrated $CaCl_2$ solution as a by-product of its processes and where such solution cannot be used/treated internally or sold externally and HCl needs to be regenerated. The regenerated HCl can be reused internally in the production process or sold on the external market.

Also encompassed herein is the use of the solid product (α-HH) described herein in the production of plaster board used in the drywall construction industry for example.

It is provided a process for regenerating HCl from $CaCl_2$ solutions, which has not been previously economically feasible and hence not been practiced on an industrial scale so far. Furthermore, it is provided a means for the metallurgical industry to recycle $CaCl_2$ waste solution streams and hence make these operations more environmentally-friendly.

The process described herein provides a significant improvement over the commercially-existing autoclave-based production of α-HH, a construction material that is already in use. The process described herein utilizes a continuous mode of operation and uses much lower temperatures, such as at room temperature for example, preferably at 40-70° C. compared to known processes (115-130° C. for conventional processes). In addition, the processing time is reduced from several hours for known conventional processes to less than 3 h, preferably 1-2 h.

Contrary to the salt solution method, which uses concentrated $CaCl_2$ solutions or mixtures of $CaCl_2$—$MgCl_2$—KCl to convert calcium sulfate dihydrate from flue gas desulfurization operations into α-HH, the temperature used in the present process is lower and the processing time is shorter. Furthermore, the salt solution process cannot be integrated into the larger context of a hydrometallurgical extraction process that continuously produces $CaCl_2$ solution. This is because the salt solution is not transformed/consumed during the process of calcium sulfate dihydrate to α-HH conversion. Hence, the salt solution method does not provide an answer to the problem of spent $CaCl_2$ solution treatment and acid regeneration in the same way as the present process does.

Laboratory crystallization studies are carried out in batch or semi-batch reactors. The latter has been the system of choice as it allows operation in constant composition mode. This concept achieves a constant supersaturation level via regulated reagent addition. This technique has proven particularly successful with relatively dilute reagent solutions when precipitation of sparingly soluble compounds at a controlled pH level is practiced. As such, the semi-batch constant composition crystallization system can also simulate steady-state crystallization as encountered in continuous stirred-tank crystallizers that are widely used in large-scale industrial operations. However, in many cases the semi-batch crystallization results may not be entirely transferable to the continuous crystallizer operation mainly because of differences in the residence time distribution and mixing effects. It has been discovered that crystallization of meta-stable phases in concentrated acidic solutions not amenable to pH control, due to excessive acidity levels for pH probes, constitutes another case where employment of a continuous stirred-tank reactor (CSTR) during the development stage offers distinct superiority over the semi-batch precipitation approach.

It is provided herein the results of continuous crystallization experiments in the context of HCl regeneration from concentrated calcium chloride solutions. Such solutions are generated in chloride-based hydrometallurgical processes. One example is the HCl leaching of calcium-based ores for rare earth extraction. However, regeneration of HCl via pyrohydrolysis of $CaCl_2$ solutions is not feasible due to the very high temperatures (~800-1000° C.) required. This has prompted exploration of alternative HCl regeneration routes.

To this end, a reactive crystallization process involving stage-wise reaction of concentrated calcium chloride solution (up to 5 mol/L) with concentrated sulfuric acid (up to 18 mol/L) at temperatures below 100° C. in a semi-batch configuration has been investigated previously, based on the following equation

$$CaCl_2 + H_2SO_4 + xH_2O \rightarrow 2HCl + CaSO_4 \cdot xH_2O \quad (1)$$

In principle, depending on the process operating window defined in terms of temperature, solution composition, [HCl] and [CaCl$_2$], and time, the reaction can be controlled to produce metastable calcium sulfate dihydrate (DH, x=2) or metastable calcium sulfate α-hemihydrate (α-HH, x=0.5), while avoiding formation of the thermodynamically stable, but undesirable, calcium sulfate anhydrite (AH, x=0). The process is feasible due to the low solubility of calcium sulfates, especially if a small amount of calcium chloride is still present in solution. In order to obtain high strength HCl, both reagents (CaCl$_2$, H$_2$SO$_4$) need to be used at high concentration, which causes the water activity of the solution to be significantly reduced. It has been shown that the availability of free water, reflected by the magnitude of water activity, is a key parameter controlling calcium sulfate phase (meta-)stability in addition to the effect of temperature. Over the temperature range 55° C.–95° C., α-HH was found to be the favored metastable phase while DH is the metastable phase at lower temperature. AH is always the stable phase in the relevant composition range. It has been shown that the lifetime of DH and α-HH primarily depends on the level of HCl concentration, which has the greatest impact on the water activity in the system by lowering it. This makes the production of the metastable phases very challenging, as their conversion to the undesirable stable AH phase is a constant threat.

So far, nothing exists showing a successfully operating continuous HCl regeneration process from concentrated CaCl$_2$ solutions. Up to now, the production of DH and/or α-HH in a continuous crystallization reactor cascade via adaptation of a semi-batch staged crystallization scheme failed to generate super-azeotropic strength HCl without forming the undesirable anhydrite (AH) phase. The present provides a newly-developed continuous process that yields high strength HCl (up to 9.5 mol/L, ≈30% super-azeotropic strength) by reactive crystallization of α-HH without forming anhydrite. The present process was designed on the basis of water activity calculations made with the OLI Stream Analyzer software. It was demonstrated using a single-stage CSTR crystallizer (see FIG. 12), which can be implemented in a parallel reactor scheme upon industrial scale up, rather than the more conventional in-series approach.

Accordingly, the process described herein consists of a single, continuous, stirred tank reactor (CSTR) in which the following reaction is performed:

$$CaCl_2 + H_2SO_4 + xH_2O \rightarrow 2HCl + CaSO_4 \cdot xH_2O \quad (2)$$

where x=0.5 or 2.

This reaction is performed at a stoichiometric sulfate to calcium ratio of the inflow solutions of 0.90 to 0.98 in a single step and in continuous fashion. It results in the generation of super-azeotropic HCl with up to ≈30 wt. % (9.5 mol/L). The temperature of the reaction inside the stirred reactor can be about ≤60° C. for the production of α-HH crystals or ≤40° C. for the production of DH crystals. The nominal residence time of the crystals in the reaction tank is preferably 1 h. CaCl$_2$ and H$_2$SO$_4$ solution is constantly fed by pumps to the reactor and the reaction product (slurry consisting of HCl acid and α-HH or DH solid) is continuously removed.

Depending on the concentration of the inflow solutions and the stoichiometric ratio, as summarized in Table 1, it can be seen that different HCl concentrations can be obtained in a stable manner for several hours.

TABLE 1

Summary of experimental parameters and properties

| | Experimental parameter and solution compositions | | | | | | Steady-state product properties | | | | |
|---|---|---|---|---|---|---|---|---|---|---|---|
| Exp. no. | Temperature °C. | Reaction extent, (SO$_4^{2-}$/Ca$^{2+}$ ratio)* %, — | Feed solution CaCl$_2$ conc. mol/L | Feed solution H$_2$SO$_4$ conc. mol/L | CaCl$_2$ flow rate, actual (target) mol/h | H$_2$SO$_4$ flow rate (target) mol/h | Steady state HCl conc. ± standard dev mol/L | Steady state CaCl$_2$ conc. ± standard dev mol/L | Solid content % | Solid produced at steady state | Median particle size μm |
| Experiments with target product DH | | | | | | | | | | | |
| CT2 | 40 | 33.3, (0.95) | 5.06 | 12.54 | 3.99 (4.00) | 1.25 (1.25) | 2.8 ± 0.1 | 3.4 ± 0.2 | 17 | HH | 16 |
| CT3 | 40 | 100, (0.90) | 3.03 | 5.40 | 1.79 (1.80) | 1.63 (1.62) | 4.0 ± 0.1 | 0.4 ± 0.0 | 24 | DH | 97 |
| CT4 | 30 | 100, (0.90) | 5.04 | 7.71 | 2.94 (3.00) | 2.65 (2.70) | 6.7 ± 0.2 | 0.5 ± 0.0 | 35 | DH & HH traces | 40 |
| Experiments with target product HH | | | | | | | | | | | |
| CT6 | 60 | 100, (0.90) | 4.94 | 7.71 | 2.97 (3.00) | 2.49 (2.70) | 5.9 ± 0.1 | 0.8 ± 0.1 | 31 | HH | 25 |
| CT9 | 60 | 100, (0.95) | 5.06 | 17.87 | 3.95 (3.95) | 3.95 (3.75) | 8.9 ± 0.1 | 0.5 ± 0.1 | 36 | HH | 27 |
| CT10 | 60 | 100, (0.95) | 5.11 | 17.87 | 3.89 (3.95) | 3.88 (3.75) | 9.0 ± 0.2 | 0.3 ± 0.1 | 36 | HH | 33 |
| CT12 | 56 ± 1** | 100, (0.95) | 5.11 | 17.87 | 3.61 (3.95) | 3.95 (3.75) | 9.5 ± 0.2 | 0.1 ± 0.0 | n.a. | HH | 61 |

The process encompassed herein was tested on a lab scale using a temperature-controlled reactor with a working volume of 1 L over a period of 10 h, during which the process was operated at stable steady state conditions for 6.5 h. An example of an experimental set up can be seen in FIG. 1.

The crystallization experiments as described herein were carried out in a continuous-stirred tank reactor 5. Encompassed herein is the use of multiple reactors in parallel. The working volume of the reactor 5 was 1 L, which was maintained by the overflow of the slurry through a 1 cm diameter tube at the side of the reactor. A turbulent mixing regime was achieved with a two-level pitched blade impeller with 3 blades at each level, having a hydrodynamic diameter of 6 cm (3 cm apart vertically) controlled by a speed motor 3. The stirrer speed was adjusted as necessary to maintain good mixing and slurry flow inside the reactor 5; it was set to 300 rpm at the beginning of the experiment (low solids content) and subsequently increased up to 700 rpm at steady state condition. The sulfuric acid and calcium chloride solutions 1 were fed drop-wise with peristaltic pumps 2 at different flow rates in order to maintain a residence time of 60 min and account for the stoichiometry of the experiment. The temperature was maintained by either heating the reactor with a temperature controlled hot-plate 4 or by cooling the reactor with compressed air to stabilize it at a certain temperature (in the case of DH experiments only). The latter was necessary to offset the heat released from acid ($H_2SO_4$) mixing and the reaction. All solutions were prepared with deionized water (DIW), and ACS reagent grade chemicals. The produced HCl-solid mixture was collected in a receiving container 6.

Since a continuous reactor goes through a start-up phase before it reaches steady state conditions, the effect of different starting solution compositions was tested. In some experiments, the start-up was done with water and in some experiments a synthetic solution with a composition closer to the expected steady-state composition was used (Table 2).

TABLE 2

Detailed experimental results

Experimental parameter and solution compositions

| Exp. no. | Temperature °C. | Reaction extent target ($SO_4^{2-}$/Ca ratio) %, — | Feed solution $CaCl_2$ conc. mol/L | Feed solution $H_2SO_4$ conc. mol/L | $CaCl_2$ flow rate, actual (target) mol/h | $H_2SO_4$ flow rate (target) mol/h | Retention time min |
|---|---|---|---|---|---|---|---|
| Experiments with DH as target ||||||||
| CT1 | 40 | 33.3, (0.95) | 5.32 | 12.54 | 3.94 (4.0) | 1.19 (1.25) | 61 |
| CT2 | 40 | 33.3, (0.95) | 5.06 | 12.54 | 3.99 (4.0) | 1.25 (1.25) | 60 |
| CT3 | 40 | 100, (0.90) | 3.03 | 5.40 | 1.79 (1.8) | 1.63 (1.62) | 60 |
| CT4 | 30 | 100, (0.90) | 5.04 | 7.71 | 2.94 (3.0) | 2.65 (2.70) | 64 |
| CT5 | 13 | 100, (0.90) | 5.00 | 18.00 | 3.98 (4.0) | 3.42 (3.60) | 64 |
| Experiments with α-HH as target ||||||||
| CT6 | 60 | 100, (0.90) | 4.94 | 7.71 | 2.97 (3.0) | 2.49 (2.70) | 66 |
| CT7 | 60 | 100, (0.90) | 4.96 | 18.00 | 3.90 (4.0) | 3.05 (3.60) | 64 |
| CT9 | 60 | 100, (0.95) | 5.06 | 17.87 | 3.95 (3.95) | 3.95 (3.75) | 56 |
| CT10 | 60 | 100, (0.95) | 5.11 | 17.87 | 3.89 (3.95) | 3.88 (3.75) | 56 |
| CT12 | 56 ± 1** | 100, (0.95) | 5.11 | 17.87 | 3.61 (3.95) | 3.95 (3.75) | 60 |

Steady-state product properties

| Exp. no. | Steady state HCl conc. ± standard dev mol/L | Steady state $CaCl_2$ conc. ± standard dev mol/L | Solid content % | Solid produced at steady state (Median particle size) μm | Seed type used | Start-up solution type |
|---|---|---|---|---|---|---|
| Experiments with DH as target |||||||
| CT1 | 2.88 ± 0.07 | 3.55 ± 0.07 | 14 | HH (12) | lab made DH | synthetic |
| CT2 | 2.75 ± 0.12 | 3.41 ± 0.19 | 17 | HH (16) | lab made DH | DI water |
| CT3 | 4.02 ± 0.10 | 0.38 ± 0.02 | 24 | DH (97) | lab made DH | DI water |
| CT4 | 6.74 ± 0.19 | 0.48 ± 0.02 | 35 | DH, HH traces (40) | lab made DH | DI water |
| CT5 | 8.13 ± 0.18 | 0.92 ± 0.04 | 36 | DH/HH mix (9) | lab made DH | DI water |
| Experiments with α-HH as target |||||||
| CT6 | 5.94 ± 0.12 | 0.77 ± 0.05 | 31 | HH (25) | lab made α-HH | synthetic |
| CT7 | 6.74 ± 0.17 | 1.22 ± 0.08 | 32 | HH (7) | lab made α-HH | synthetic |
| CT9 | 8.88 ± 0.12 | 0.45 ± 0.04 | 36 | HH (27) | lab made α-HH | synthetic |
| CT10 | 8.97 ± 0.2 | 0.33 ± 0.07 | 36 | HH (33) | Knauf FGD* α-HH | synthetic |
| CT12 | 9.52 ± 0.21 | 0.11 ± 0.04 | n.a. | HH (61) | lab made α-HH | synthetic |

The reason for this investigation was to determine if the time to reach steady state or if the stability of the seed crystals would be affected. With reference to the latter, emphasis was placed on ensuring that the DH or HH crystals used as seed would not undergo phase transformations during the start-up period. In other words, the strategy was to have the right crystal phase (DH or HH depending on the desired end product) present during the unsteady-state start-up of the process.

Figure 2A:
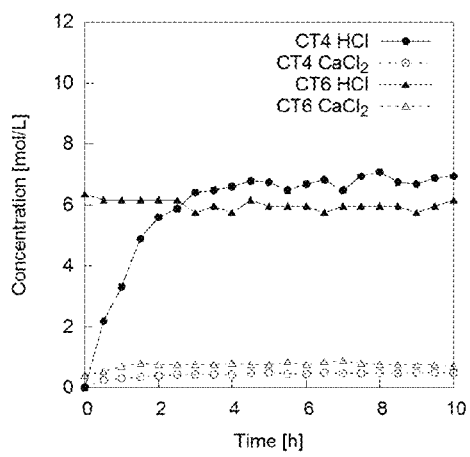
FIG. 2A illustrates the evolution of HCl and $CaCl_2$ concentration over operating time for experiments run at 30° C. (CT4) and 60° C. (CT6) under different start-up modes.
Figure 2B:
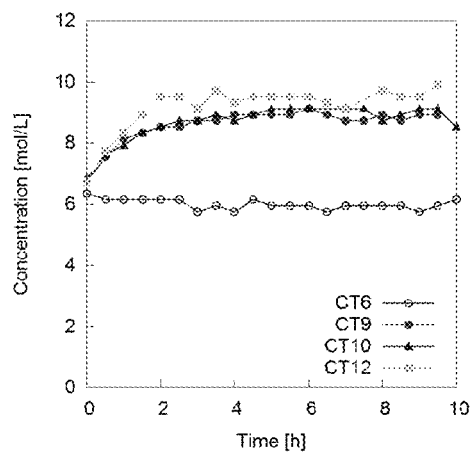
FIG. 2B illustrates the evolution of HCl concentration over time for experiments producing azeotropic and super-azeotropic strength HCl.

FIG. 2A shows the evolution of acid concentration and $CaCl_2$ concentration over time for two typical experiments (CT4, CT6). It can be seen that steady state was reached after approximately 3.5 h in both cases and that the process is reasonably stable. As can be seen in the experiment that was started with deionized water (CT4), a fast build-up of acid concentration within the first few hours was observed. On the other hand, in an experiment started with a synthetic solution of near steady-state composition (CT6), steady-state was also reached after 3-3.5 h.

The choice of the start-up mode is dictated by the targeted product, DH or α-HH. This is because it is important to avoid phase transformation of the seed crystals during start-up. For example, if α-HH seed crystals are added to DIW at the beginning of a test targeting α-HH as product, this will not work as after the ramp-up phase α-HH will have converted to DH as the latter is the thermodynamically stable phase in water at temperatures below 42° C. These results allow the selection of suitable start-up conditions, thus avoiding complications.

It has been shown previously that apart from the activity of water (governed by solution composition), the temperature at which the crystallization-based acid regeneration process is performed influences the crystal phase that is formed. The heat released by the reaction system needs to be taken into account in the process design as it is significant, especially with high reactant stream concentrations. For example, a calculation with OLI Stream Analyzer showed that the heat released from mixing and the reaction between the reagents was 310 kJ/h. This calculation was done for experiment CT5 (5 mol/L $CaCl_2$ at 3.98 mol/h and 18 mol/L $H_2SO_4$ at 3.42 mol/h). As a result of the high level of heat released, a steady-state temperature was attained in the non-insulated, single-walled glass reactor in the case of experiment CT12. A temperature of 56° C. was measured while the ambient temperature was 23° C. during the experiment, which was run without any temperature control. This means that the process can essentially run autogenously if concentrated feed solutions are used.

Previous semi-batch crystallization work with a similar system showed that calcium sulfate dihydrate (DH) could exist in a solution with a composition of ~2.8 mol/L HCl and ~3.5 mol/L $CaCl_2$ at 40° C., as was the case in CT1 and CT2, for a time sufficiently longer than the residence time of 60 min. Surprisingly, DH was not obtained as the steady state product, but rather α-HH (see Table 2). This underlines the importance of performing continuous crystallization tests in the case of metastable crystal phases.

The observed behavior is explained with the help of FIG. 3, which shows estimations of the water activity ($a_w$) as a function of HCl and $CaCl_2$ concentration. The calculations were made with OLI Stream Analyzer. A value for $a_w$ close to 1 means that the "lifetime" of the metastable phase in contact with the solution will be significantly extended. From Equation 2 and FIG. 3, a concentrated $CaCl_2$ feed solution, for example 5 mol/L, will be converted to a certain HCl concentration (approximately two times the $CaCl_2$ concentration). Therefore, the steady state condition will always be diagonally (left and up) from the initial calcium chloride concentration in such a diagram, since calcium is consumed/precipitated as calcium sulfate and HCl is left in solution.

This situation is illustrated with the results of experiments CT1, CT2 and CT3 conducted at 40° C. (FIG. 3A). Although CT1 and CT2 should have formed DH (as CT3 did), α-HH was formed instead. The reason for the formation of α-HH is that the steady state composition of CT1 and CT2 in comparison to CT3 was in a less favorable region in terms of water activity despite the lower acid concentration (2.75 mol/L HCl in CT2 vs. 4 mol/L HCl in CT3). This realization, that it is the water activity that governs the crystal production process, prompted the idea to opt for a single CSTR operating at low steady-state $CaCl_2$ concentration that is associated with a relatively higher water activity. In this way, the relative metastability of the target phase is enhanced, allowing for high HCl concentrations to be achieved. The dashed line in FIG. 3 denotes the change of relative metastability, i.e., below the line DH is relatively more stable than α-HH and above the line α-HH is relatively more stable than DH. In all conditions investigated, calcium sulfate anhydrite is the thermodynamically stable phase.

This water activity-based single-stage crystallization approach also proved to have beneficial effects on crystal growth as reflected by the particle size distribution data in Table 1, FIGS. 4 and 5. Thus the DH crystals produced at the relatively high acid concentration of 4 mol/L HCl but low (0.38 mol/L) $CaCl_2$ concentration (CT3 test) were much larger than the HH crystals produced at the same temperature (40° C.) but lower HCl concentration (2.75 mol/L HCl) and correspondingly higher (3.4 mol/L) $CaCl_2$ concentration (CT2 test). There are two influences to distinguish, namely that of water activity and that of calcium chloride/calcium ion concentration in solution. The water activity in the former case (CT3) was higher than the corresponding one in the latter case. This caused a different phase to form DH, which has a higher relative metastability.

A comparison of the particle size data shows in the case of CT2 the fraction of crystals being smaller than 10 μm was 43% while in the case of CT3 it was only 6%. It is proposed that this difference is due to high $CaCl_2$ concentration in CT2. In this situation, homogeneous nucleation prevails as a result of high supersaturation, hence the smaller crystal size. By contrast, crystallization at low $CaCl_2$ concentration favors crystal growth of existing crystals over nucleation, due to lower supersaturation. It should be noted that large crystals have better filtration characteristics than small ones.

In essence, it is demonstrated that water activity will determine the crystal phase that is formed, while the residual $CaCl_2$ concentration will influence the particle growth/size characteristics of that solid phase.

Figure 6A:
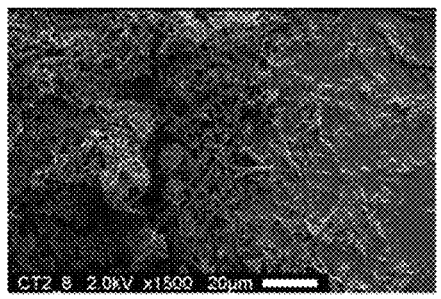
FIG. 6A illustrates a scanning electron microscope (SEM) image showing the crystal morphology and size of α-HH crystals produced at a steady-state concentration of 3.4 mol/L (CT2) of $CaCl_2$.
Figure 6B:
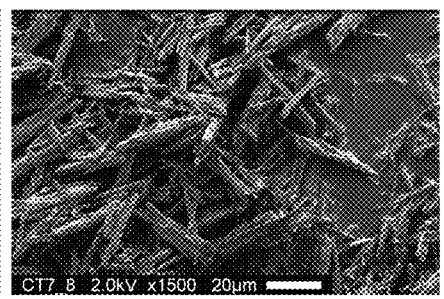
FIG. 6B illustrates a SEM image showing the crystal morphology and size of α-HH crystals produced at a steady-state concentration of 1.2 mol/L (CT7) of $CaCl_2$.
Figure 6C:
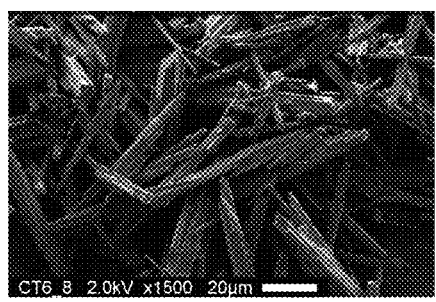
FIG. 6C illustrates a SEM image showing the crystal morphology and size of α-HH crystals produced at a steady-state concentration of 0.8 mol/L (CT6) of $CaCl_2$.
Figure 6D:
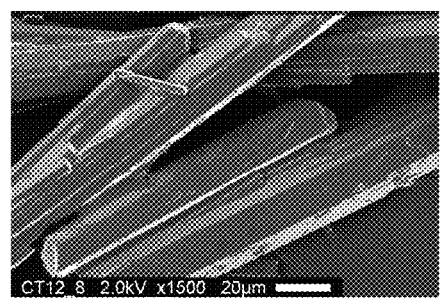
FIG. 6D illustrates a SEM image showing the crystal morphology and size of α-HH crystals produced at a steady-state concentration of 0.1 mol/L (CT12) of $CaCl_2$.

Experiments CT1 and CT2, which were run at 40° C., yielded α-HH crystals as a result of operating at low water activity. In both experiments, the α-HH crystals were rather fine and of poor quality as evident by their SEM morphology (see FIG. 5A), particle size distribution (FIG. 6A), and differential scanning calorimetry scans (DSC in FIG. 6B). Furthermore, the obtained acid concentration in this case (CT2) was quite low and not of interest from an industrial process point of view (only ~2.7 mol/L, see Table 1). However, by increasing the temperature to 60° C. and lowering the steady-state $CaCl_2$ concentration below 1 mol/L, larger α-HH crystals were produced (see Table 1, CT6) at a higher HCl concentration of roughly azeotropic strength of ~5.9 mol/L. The crystal size of α-HH was observed to be very dependent on the steady-state $CaCl_2$ concentration level. For example, the size distribution of CT7 (median particle size given in Table 2) that was run at 1.2 mol/L $CaCl_2$ showed the presence of a significant amount of fines. By reducing the level of $CaCl_2$, the generation of fines was eliminated and crystal growth was promoted as demonstrated by the size distribution data of CT9, CT10 and CT12. It can be seen in the case of the CT12 test that the α-HH had grown to large, elongated prismatic shape crystals (FIG. 6D) while the generated HCl acid concentration was of super-azeotropic strength, ~9 mol/L (or 30%), while at higher $CaCl_2$ concentrations much finer HH crystals were produced (FIGS. 6A-C).

Figure 7A:
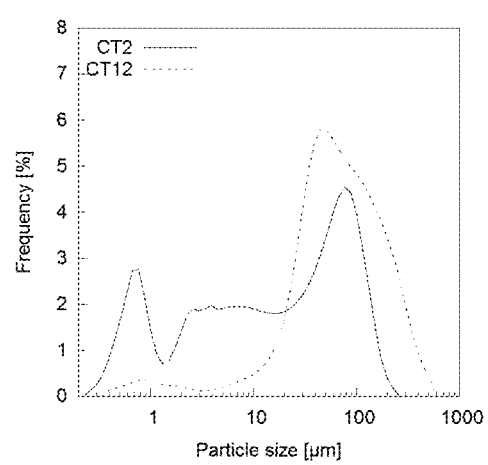
FIG. 7A illustrates the effect of steady-state crystallization conditions on α-HH crystal size distributions at CT2 conditions and CT12 conditions.
Figure 7B:
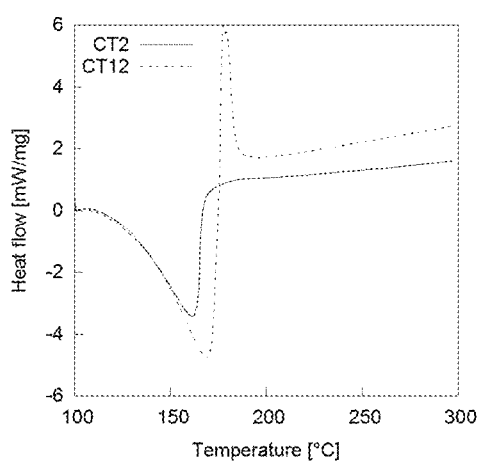
FIG. 7B illustrates the effect of steady-state crystallization conditions on α-HH crystal size quality as characterized by differential scanning calorimetry (DSC) at CT2 conditions and CT12 conditions.

DSC measurements further confirmed the high quality of the α-HH crystals, as revealed by the sharp endothermic/exothermic peaks (FIG. 7B). High quality α-HH provides for a better binder material than the more commonly used β-HH phase.

Further analysis shows a direct relationship between the fraction of very fine crystals (<1 µm) and the exothermic peak signal in the DSC measurements (see FIG. 8A). The latter was quantified by measuring the area underneath the peak to the baseline of the signal. In addition, there is a direct relationship between the amount of fines and the concentration of $CaCl_2$ at steady-state (see FIG. 8B). The differently-sized crystals and the relationship to the steady-state $CaCl_2$ concentration were also confirmed by the SEM images presented in FIG. 6. It can be clearly seen that α-HH crystals produced under conditions of lower steady-state calcium chloride concentration are much larger than those produced at much higher $CaCl_2$ concentration. This behavior relates to the prevailing supersaturation condition, which is directly influenced by the magnitude of the $CaCl_2$ concentration.

The effect of $CaCl_2$ on crystal growth—as contrasted between CT2 ("high" $CaCl_2$ concentration, fine crystals) and CT12 ("low" $CaCl_2$ concentration, large crystals) tests—can be explained by considering the local supersaturation generated upon the entry of a droplet of concentrated sulfuric acid into the receiving solution in the reactor. Although the reactor was well and turbulently mixed, some short finite amount of time is necessary to evenly distribute the viscous $H_2SO_4$ drop. Since the crystallization reaction of calcium sulfates proceeds without any noticeable induction time, it is apparent that calcium sulfate crystals nucleate instantaneously in the immediate vicinity around the droplet, before they have the chance to be dispersed into the bulk solution.

Thus, the process described herein provides a means for the efficient regeneration of high strength HCl (up to ~9 mol/L, ~30% super-azeotropic) that is critically needed in the implementation of modern chloride hydrometallurgical processes and which was not possible until the present disclosure from calcium chloride solutions. By making use of water activity and supersaturation control concepts, a novel acid regeneration process is provided featuring the crystallization of well-grown α-HH or DH crystals in a single CSTR without formation of the undesirable AH. The process described herein involves reaction of concentrated $CaCl_2$ solution with concentrated sulfuric acid which is flexible with respect to the concentration of the regenerated HCl as well as the type of calcium sulfate phase (α-HH or DH) that is produced.

The selective production of DH or α-HH crystals with simultaneous regeneration of HCl in a continuous reactor is demonstrated for the first time. The production of DH is possible only at sub-azeotropic HCl concentration (6 mol/L) and a preferred temperature ≤40° C. The regeneration of >9 mol/L HCl with simultaneous production of α-HH was achieved with little to no heating at 60° C., due to the strongly exothermic nature of the dilution of the $H_2SO_4$ feed and the reaction itself. The concentration of $CaCl_2$ at steady-state influenced the crystal size distribution of α-HH. Lower concentrations, e.g., 0.5 mol/L or below, led to larger crystals with narrower particle size distribution, effectively lowering the fraction of fines (crystals of <10 µm). This behavior is attributed to a lower local supersaturation environment. In contrast, the high calcium chloride concentration and low water activity that is encountered in multi-stage reactor set-ups severely reduces the life-time of α-HH crystals, making the regeneration of high-concentration acid unfeasible.

Figures 11A, 11B:
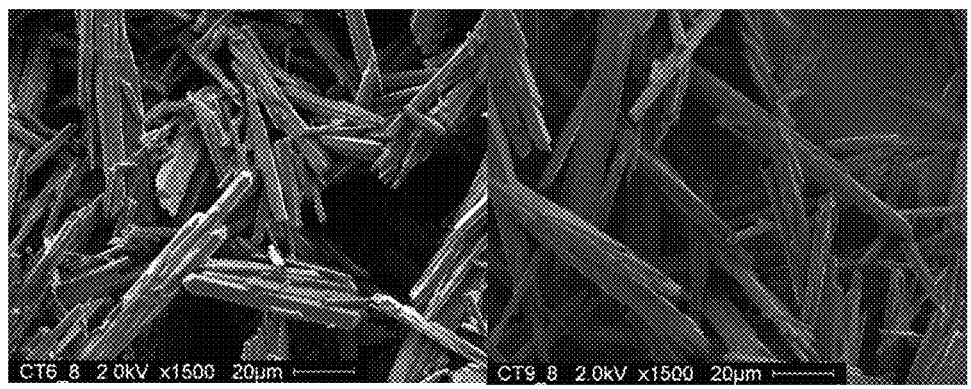
FIG. 11A illustrates the crystal morphology of α-HH produced by the process described herein according to one embodiment under CT6 conditions (t=8 h).
FIG. 11B illustrates the crystal morphology of α-HH produced by the process described herein according to one embodiment under CT9 conditions (t=8 h).
Figures 11C, 11D:
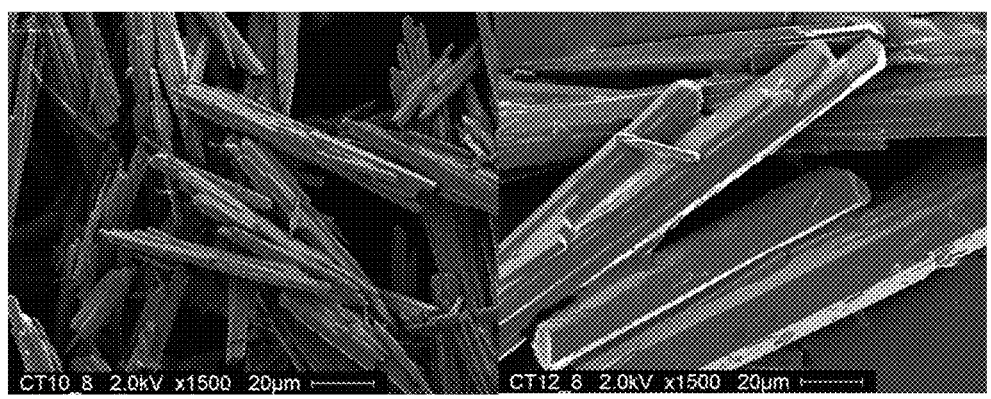
FIG. 11C illustrates the crystal morphology of α-HH produced by the process described herein according to one embodiment under CT10 conditions (t=8 h).
FIG. 11D illustrates the crystal morphology of α-HH produced by the process described herein according to one embodiment under CT12 conditions (t=8 h).
Figure 11E:
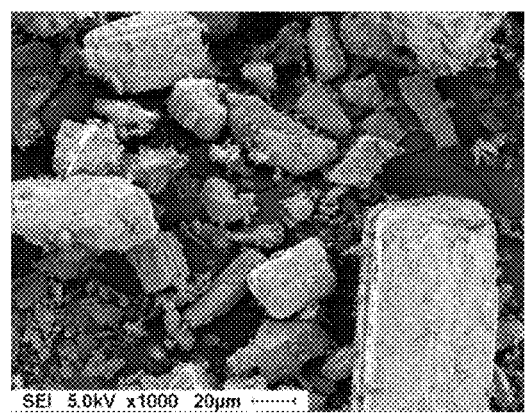
FIG. 11E illustrates the crystal morphology of α-HH produced with a process according to current commercially-available material.

When solid α-HH is produced by the process described herein, characterization by X-ray diffraction, Differential Scanning calorimetry and Scanning Electron Microscopy compared to commercially available α-HH produced with the state of the art autoclave method (FIGS. 9-11) respectively, demonstrates that the solid produced by the process described herein produces crystals that are similar in size and crystal shape.

The process described herein provides a means for regenerating HCl from $CaCl_2$ solutions which are generated in the metallurgical industry when leaching calcium-bearing ores to extract rare earths, for example. Accordingly, it is provided a means to recycle $CaCl_2$ waste solution streams and hence make these operations more environmentally-friendly.

Calcium bearing ores are, for example, sedimentary rock deposits of gypsum, limestone, skarn and shale. Some common calcium-bearing minerals include apatite, calcite, dolomite, fluorite, and gypsum (calcium sulfate).

Figure 12:
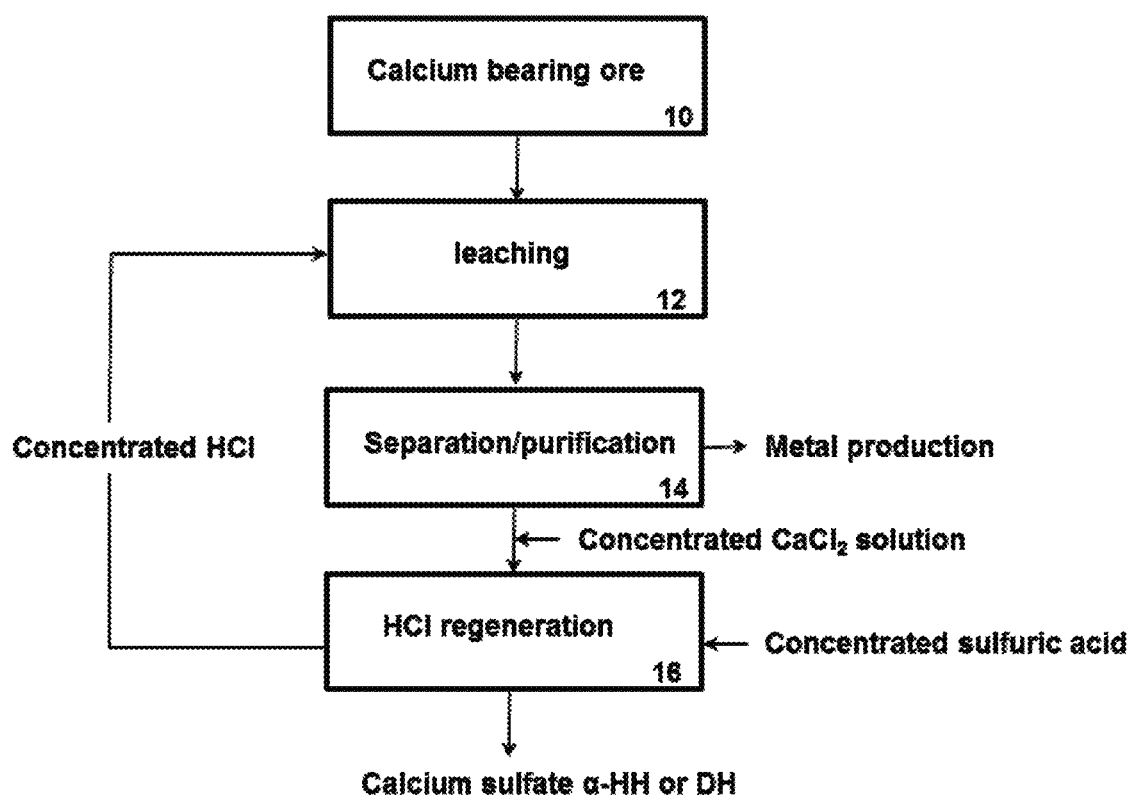
FIG. 12 illustrates a flow sheet of the acid regeneration process described herein incorporated in a metallurgical process.

As depicted in FIG. 12, normal extraction metallurgical processes incorporating the process described herein consist in leaching 12 using HCl ores, preferably calcium-bearing ores 10 in order to produce a leachate containing metals and a calcium chloride solution. After separation/purification 14, the calcium solution collected can be integrated in the process (HCl regeneration process described herein 16) in a reactor in order to extract calcium sulfate crystals and HCl which is recycled back to the leaching step 12.

The present disclosure will be more readily understood by referring to the following examples which are given to illustrate embodiments rather than to limit its scope.

EXAMPLE I

Crystallization Experiments

The crystallization experiments were carried out in a continuous stirred-tank reactor. The working volume of the reactor was 1 L, which was maintained by the overflow of the slurry through a 1 cm diameter tube at the side of the reactor. A turbulent mixing regime was achieved with a two-level pitched blade impeller with 3 blades at each level, having a hydrodynamic diameter of 6 cm (3 cm apart vertically). The stirrer speed was adjusted as necessary to maintain good mixing and slurry flow inside the reactor; it was set to 300 rpm at the beginning of the experiment (low solids content) and subsequently increased up to 700 rpm at steady state condition. A nearly ideal residence time distribution was achieved in all tests.

The sulfuric acid and calcium chloride solutions were fed drop-wise with peristaltic pumps at different flow rates in order to maintain a residence time of 60 min and account for the stoichiometry of the experiment. The temperature was maintained by either heating the reactor with a temperature controlled hot-plate or by cooling the reactor with compressed air to stabilize it at a certain temperature (in the case of DH experiments only). The latter was necessary to offset the heat released from acid ($H_2SO_4$) mixing and the reaction. All solutions were prepared with deionized water (DIW), and reagent grade chemicals.

Slurry samples were taken from the reactor every 30 min and immediately filtered through 0.22 μm Millipore Swinnex filters. The recovered crystals (~1-1.5 g) were immediately washed with isopropanol after filtration and stored in test tubes covered by a layer of isopropanol before further analysis. This procedure successfully prevents any potential phase transformation of the crystals, especially α-HH, which is a metastable phase and might otherwise be susceptible to reaction with ambient moisture.

Liquid samples taken during the experiment were immediately diluted with deionized water by a factor of 10, in order to avoid any further precipitation of calcium sulfates due to temperature change. The solutions were analyzed for acid concentration and $Ca^{2+}$ concentration via titration of 1 mL of the diluted sample.

The solids were characterized by X-ray powder diffraction performed with a Cu Kα Philips PW 1710 diffractometer. Additionally, crystal size distributions were measured in isopropanol with a Horiba Laser Scattering Particle Size Distribution Analyzer LA-920. Scanning electron microscopy was performed with a Philips XL30 FEG-SEM; samples were coated with carbon in order to avoid charging effects during imaging. In addition, differential scanning calorimetry (DSC) was carried out on a TGA Instruments Q2000 apparatus, with a heating rate of 10 K/min and a nitrogen gas flow of 50 mL/min in closed aluminum crucibles. The latter two types of measurements were performed on selected samples to obtain information about the crystal morphology and the type of calcium sulfate hemihydrate produced, respectively. Especially, DSC is capable of identifying α-HH, due to a sharp exothermic peak found in the thermograms.

In order to characterize the slurry properties during steady state conditions, its solid content was determined on the basis of dry weight of produced solid to slurry weight at the end of the experiment.

EXAMPLE II

Effect of Temperature on Dihydrate Production at High HCl Concentration

Reduction of the temperature at which the crystallization is performed (from 40° C. to 30° C. to 13° C.) helped to increase the steady state HCl concentration, while DH with only a minor α-HH content was produced at 30° C. or a mix of DH/α-HH at 13° C. This shows that a water activity of ≥0.5 is required to operate in the window of DH "life-time" allowing for the precipitation of a pure solid phase. In the case of CT5, it appears that the temperature was not low enough to stabilize DH for a sufficiently long time, i. e., longer than the retention time in the reactor. This is due to the fact that the steady-state composition of the solution was in a region with a water activity value that was too low. Therefore, it can be seen that in order to obtain pure DH crystals at high acid concentration (>7 mol/L HCl), it will be necessary to cool the reactor to temperatures well below 13° C.

EXAMPLE III

Effect of Seed Material on Product Morphology

A comparison between a situation in which commercial seed crystals of α-HH (CT10) were used in the process during start-up with an experiment where lab-made α-HH (CT9) crystals were used showed no difference in particle size of the steady-state product after 8 h. A comparison of the seed material with SEM images of process product shows that even after 0.5 h almost no compact commercially-available α-HH crystals are left. It appears that these crystals would have dissolved and re-precipitated in the more elongated (rod-shaped) form, which is typical of α-HH produced under the conditions of discussing HCl regeneration process. Further support for this explanation is given by the fact that calcium sulfates experience higher solubility at high HCl content when only low concentrations of calcium ions are present.

EXAMPLE IV

Influence of Nominal Retention Time on Process

As shown by experiments CT9, CT10 and CT12, it was possible to produce α-HH and simultaneously recover high-strength HCl. In all cases the nominal retention time, defined by reactor volume divided by reagent flow rate, was ~60 min. In order to investigate the effect of a shorter residence time of ~30 min, two experiments were conducted with 5 mol/L $CaCl_2$ and 11.1 mol/L (CT15) or 18.2 mol/L (CT14) $H_2SO_4$ solution. The volumetric flow rates were adjusted to obtain the target nominal retention time. In both cases, no steady state conditions were achieved. In the case of CT14, the slurry became impossible to mix after 30 min and in the case of CT15 this happened after 1 h. XRD results confirmed the presence of calcium sulfate anhydrite (at least partially). It is known that the morphology of this phase's crystals is very fine and fibrous. Therefore, under these conditions a phase transformation of α-HH to AH occurred. The reason for this is that the increased molar flow rate, which delivers more sulfuric acid per time to the same point in the reactor than in the 60 min retention time experiments, caused a zone of high acid concentration resulting in local low water activity. This created a favorable environment for the formation of AH. Therefore, it can be concluded that the nominal retention time of the reactor should be at least one hour and preferably below 2-3 h, which showed that especially at high acid strength the metastable life-time of α-HH is only a few hours, before transformation to the thermodynamically stable AH phase starts.

While the present disclosure has been described with particular reference to the illustrated embodiment, it will be understood that numerous modifications thereto will appear to those skilled in the art. Accordingly, the above description and accompanying drawings should be taken as illustrative and not in a limiting sense.

While the disclosure has been described in connection with specific embodiments thereof, it will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A method for producing calcium sulfate solid crystals and azeotropic hydrochloric acid (HCl) from a calcium chloride solution comprising the steps of:
   feeding a continuous-stirred tank reactor with a calcium chloride solution, sulfuric acid and water;
   mixing the calcium chloride solution, sulfuric acid and water in the reactor; and
   maintaining the reactor at a temperature of less than about 70° C.,
   converting the calcium chloride solution, sulfuric acid and water into azeotropic HCl and calcium sulfate solid crystals.

2. The method of claim 1, wherein the calcium sulfate solid crystals are crystals of at least one of calcium sulfate dihydrate, calcium sulfate α-hemihydrate and mixture thereof.

3. The method of claim 1, wherein up to 30 wt % (9.5 mol/L) of super-azeotropic HCl is obtained.

4. The method of claim 1, wherein the ratio of sulfate to calcium in the reactor is 0.90 to 0.98.

5. The method of claim 1, wherein the temperature of the reactor is about less than 60° C.

6. The method of claim 1, wherein the temperature of the reactor is about 40° C.-70° C.

7. The method of claim 1, wherein the temperature of the reactor is about 40° C. or less.

8. The method of claim 1, wherein the reactor is continuously fed with calcium chloride solution, sulfuric acid and water, continuously producing azeotropic HCl and calcium sulfate solid crystals.

9. The method of claim 1, wherein the calcium chloride solution is a feed stream from the processing of calcium-bearing ores.

10. The method of claim 1, wherein calcium chloride solution, sulfuric acid and water are fed in multiple parallel reactors.

11. A process of extracting metals from calcium-bearing ores comprising the steps of:
    leaching the ores with HCl, producing a leachate containing a calcium chloride solution and metals;
    separating the metals from the calcium chloride solution;
    feeding a continuous-stirred tank reactor with the calcium chloride solution, sulfuric acid and water;
    mixing the calcium chloride solution, sulfuric acid and water in the reactor;
    maintaining the reactor at a temperature of less than about 70° C., converting the calcium chloride solution, sulfuric acid and water into azeotropic HCl and calcium sulfate solid crystals; and
    recycling the HCl to the leaching of the ores.

12. The process of claim 11, wherein the calcium sulfate solid crystals are crystals of at least one of calcium sulfate dihydrate, calcium sulfate α-hemihydrate and mixture thereof.

13. The process of claim 11, wherein the metals are rare earth metals.

14. A construction board comprising calcium sulfate α-hemihydrate produced by the method of claim 1.

* * * * *